Nov. 2, 1954
O. C. RILEY ET AL
2,693,351
FROST PREVENTING DEVICE FOR GAS SYSTEMS
Filed Jan. 21, 1952
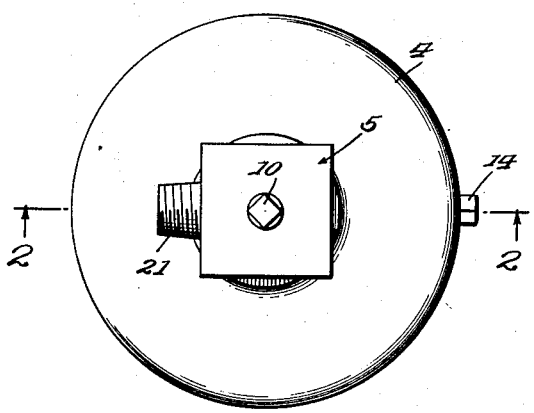
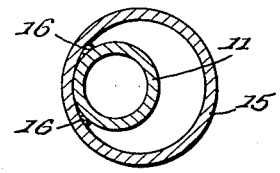
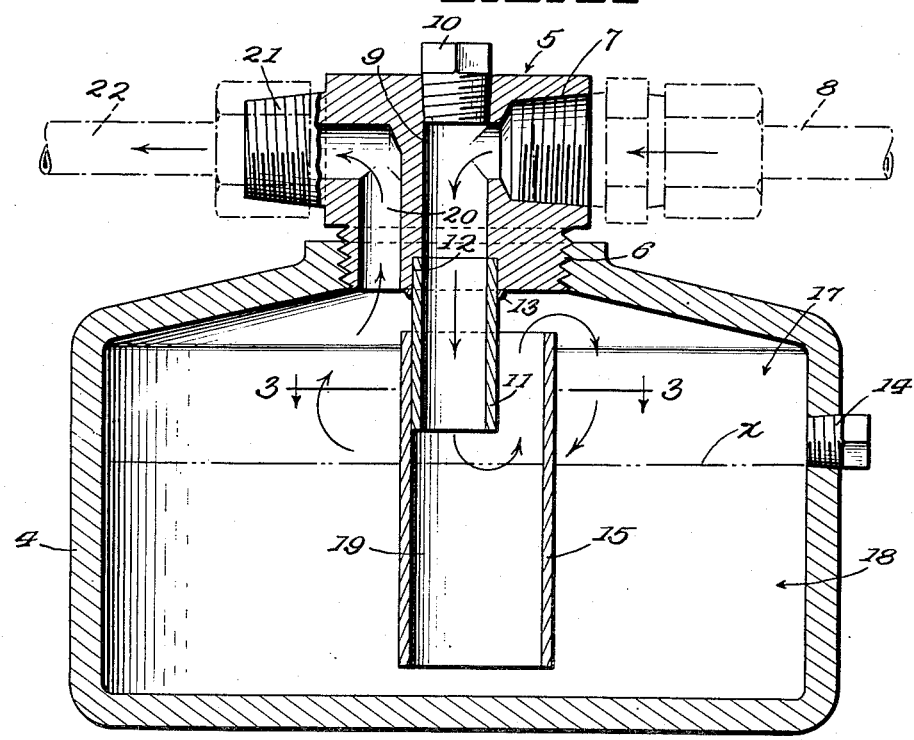
INVENTORS
O. C. Riley and J. W. Harris
BY
*[signature]*, atty.

United States Patent Office 2,693,351
Patented Nov. 2, 1954

2,693,351

FROST PREVENTING DEVICE FOR GAS SYSTEMS

Orr C. Riley, Bartlesville, and James W. Harris, Dewey, Okla.

Application January 21, 1952, Serial No. 267,491

2 Claims. (Cl. 261—119)

Our invention consists in new and useful improvements in a frost preventing device for use in connection with gas systems such as those utilizing liquified petroleum gas. The primary object of the invention is to provide a unit adapted to be interposed in the gas line, between the source of supply and the pressure regulator, adjacent the point of utilization, so as to prevent frosting in the orifice of the regulator, due to vaporization of the liquified petroleum gas.

In the past, considerable difficulty has been encountered by users of liquified petroleum gas because of the tendency of moisture condensation in the gas flow line, to freeze in the orifice of the regulator, upon the vaporization of the fuel at the critical temperatures of from 28 degrees F. to 34 degrees F. , which is one of the most prevalent causes of lowered pressure on the line. We are aware that various attempts have been made to design moisture traps and the like, in efforts to remove moisture condensation from gas lines before it reaches the regulator, but so far as we know, none has proven entirely satisfactory for numerous reasons.

We have therefore approached the problem from a different aspect and have designed a unit which, instead of trapping the moisture condensation, actually converts it into a gaseous fluid which is absorbed in the gas flow and utilized with the gas as fuel. To this end, the unit consists of a vessel or reservoir which contains a predetermined level of liquid alcohol or the like and is so constructed that when interposed in the gas line, the gas is caused to impinge upon the surface of a confined column of the alcohol within the reservoir, thereby agitating the latter to the point where a mixture of the gas with a certain quantity of alcohol, takes place. The binary takes up any moisture condensation which, by combining with the alcohol, is gradually absorbed into the gas flow through evaporation and converted into inflammable gas, leaving no residue in the vessel.

With the above and other objects in view which will appear as the description proceeds, our invention consists in the novel features hereinafter set forth, illustrated in the accompanying drawings and more particularly pointed out in the appended claims.

Referring to the drawings, in which numerals of like character designate similar parts throughout the several views, Figure 1 is a top plan view of the device;

Figure 2 is an enlarged vertical sectional view through the reservoir; and

Figure 3 is a transverse sectional view, taken on line 3—3 of Figure 2.

In the drawings, 4 represents a vessel of any suitable material and preferably of a volume of between one-half pint and one pint, which serves as an alcohol reservoir. In the form of the invention illustrated, this vessel is closed at its top by a fixture 5, which is threaded to engage complementary threads in a restricted opening 6 in the top of the vessel 4. The closure fixture 5 is designed for interposal in the gas supply line of a liquified petroleum gas system and includes an inlet opening 7 on one side, adapted to receive a suitable coupling on the end of a section 8 of the supply line. The inlet opening 7 communicates with a vertical inlet passageway 9, preferably formed by drilling from top to bottom, through the central portion of the fixture 5, as shown in Figure 3. The upper end of the passageway 9 is closed by a threaded plug 10, which as will later appear, serves as a filter plug to facilitate charging the reservoir with alcohol.

A downwardly directed inlet tube 11 forms an extension of the inlet passageway 9, fitting in an annular recess 12 at the lower end thereof, where it is preferably secured by welding as at 13 and it will be noted that the bottom of the tube 11 terminates in spaced relation above the maximum liquid level line $x$, in the reservoir 4. This maximum liquid level line may be determined by a suitably located opening and plug 14, in the side wall of the vessel 4.

Surrounding the open lower end of the tube 11 and vertically spaced from both the top and bottom of the vessel 4, is a vertical tubular sleeve 15 which may be secured in place by welding the inner face of one wall thereof, at its point of contact, to the outer face of the adjacent wall of the tube 11, as shown at 16 in Figure 3. Here it will be seen that in the preferred form of the invention, the tube 11 and sleeve 15 are arranged in eccentric relation which facilitates the mounting and support of the sleeve and as the sleeve is of larger diameter than the tube, sufficient spacing is afforded between the two, to permit the passage of gas between the tube and the sleeve, as will later appear.

The sleeve 15 is so disposed that its upper open end communicates with the gas receiving zone 17 above the liquid level line $x$, while its open lower end is immersed in the body of alcohol 18, a portion of which seeks its level and rises in the sleeve to the common liquid level $x$, as shown in Figure 2. Thus, a constant column of alcohol 19, is maintained and confined within the open sleeve 15, at a level spaced below the discharge end of the inlet tube 11, in direct line for contact by the incoming gas, flowing from line 8, through inlet passageway 9.

A separate discharge passageway 20 is drilled in the body of the fixture 5, placing the gas receiving zone 17 in communication with an outlet nipple 21, threaded to receive a suitable coupling on the end of pipe line section 22, which forms a continuation of section 8 and leads to the pressure regulator of the gas system (not shown).

In operation, the vessel 4 is first installed in the line 8—22 and charged with alcohol, by removing the filler plug 10 and level plug 14, and when the maximum liquid level line $x$ is reached, the plugs are reinserted. Fuel from a suitable source of liquified petroleum gas, flows through line 8, inlet passageway 9 and inlet tube 11, into the upper portion of the sleeve 15, as indicated by the arrows in Figure 2. Here it contacts the surface of the column of alcohol 19, confined in the sleeve, agitating the alcohol and mixing with a portion thereof, the mixture flowing out of the open upper end of the sleeve, into the gas receiving zone 17 in the vessel 4.

This mixture or binary picks up any moisture in the gas which, by combining with the alcohol, is gradually absorbed into the gas flow, through evaporation, leaving the vessel through outlet passageway 20 and continuing through line 22 to the pressure regulator of the system (not shown). The liquid level is steadily maintained in the sleeve 15, through communication at the lower end of the sleeve with the main body of alcohol 18 in the reservoir and from time to time, this body of alcohol may be replenished by the removal of the filler plug 10. It will be noted that with this eccentric arrangement of the sleeve and tube, the point of discharge from the sleeve is on the side of the gas receiving zone 17, opposite the discharge passageway 22, so that sufficient time is permitted for adequate absorption of moisture, before the gas reaches the discharge passageway.

By the use of this device, a constant flow of fuel to the point of utilization, is insured without fear of frosting in the orifice of the pressure regulator. Furthermore, the relatively small quantity of alcohol required to form the binary which is absorbed into the gas flow, has no effect on the consumption of gas and no residue is left in the vessel 4.

While we have shown one suitable form of vessel 4 and inlet tube and sleeve arrangement, these structures are purely illustrative and may be varied within the scope of the invention. For example, the sleeve 15 may be arranged concentrically with respect to the tube 11 and supported by separate means, so long as the point of discharge from the sleeve into the gas receiving zone 17, is located to permit the required absorption of moisture before reaching the discharge passageway 22 and re-entering the flow line.

It will thus be seen that we have provided a novel and efficient unit for preventing frosting, which may be readily installed in any gas system and one which, due to its simplicity of construction, is relatively inexpensive both in initial cost and maintenance.

From the foregoing, it is believed that our invention may be readily understood by those skilled in the art without further description, it being borne in mind that numerous changes may be made in the details disclosed, without departing from the spirit of the invention as set forth in the appended claims.

We claim:

1. A frost preventing device for gas systems, comprising a vessel, adapted to contain a body of alcohol with its liquid level spaced below the top of the vessel to provide a gas-receiving zone above the liquid level, an opening in the top of said vessel, a self-contained coupling, closure and moisture-converting unit comprising a closure head, removably connected in said vessel opening, gas inlet and outlet passages in said head adapted to be connected into a gas supply line, a vertical inlet tube supported by said head, connected to said inlet passage and directed downwardly into said zone, with its open lower extremity spaced above said liquid level, an open ended tubular sleeve attached to and supported by said inlet tube, vertically disposed in said vessel, with its open upper end portion lying in said gas receiving zone and surrounding the open lower end of said tube and its lower portion submerged in said body of alcohol and containing a column thereof, the upper and lower extremities of said sleeve being respectively vertically spaced from the corresponding walls of said vessel, said sleeve being of larger transverse dimensions than said tube, to afford a lateral space between their walls on at least one side, said inlet and outlet passages being arranged in communication with the gas receiving zone, and a closured filling passage in said head, axially aligned with said inlet tube.

2. A frost preventing device as claimed in claim 1, wherein said sleeve is eccentrically mounted on one side of the periphery of said inlet tube, in parallel relation thereto.

References Cited in the file of this patent

UNITED STATES PATENTS

| Number | Name | Date |
|---|---|---|
| 337,408 | Kearns | Mar. 9, 1886 |
| 886,009 | Moyer | Apr. 28, 1908 |
| 1,390,790 | Johnson | Sept. 13, 1921 |
| 1,606,032 | Kolstrand | Nov. 9, 1926 |
| 1,802,683 | Tanner | Apr. 28, 1931 |